United States Patent
Koide

(10) Patent No.: US 9,829,876 B2
(45) Date of Patent: Nov. 28, 2017

(54) NUMERICAL CONTROLLER HAVING CORNER PATH GENERATION FUNCTION IN CONSIDERATION OF POST-INTERPOLATION ACCELERATION/DECELERATION

(71) Applicant: FANUC Corporation, Minamitsuru-gun, Yamanashi (JP)

(72) Inventor: Naoya Koide, Minamitsuru-gun (JP)

(73) Assignee: FANUC CORPORATION, Minamitsuru-gun, Yamanashi (JP)

( * ) Notice: Subject to any disclaimer, the term of this patent is extended or adjusted under 35 U.S.C. 154(b) by 239 days.

(21) Appl. No.: 14/799,702

(22) Filed: Jul. 15, 2015

(65) Prior Publication Data
US 2016/0041545 A1    Feb. 11, 2016

(30) Foreign Application Priority Data

Aug. 5, 2014  (JP) ................................. 2014-159488

(51) Int. Cl.
G06F 19/00 (2011.01)
G05B 19/19 (2006.01)
G05B 19/4093 (2006.01)

(52) U.S. Cl.
CPC ....... *G05B 19/19* (2013.01); *G05B 19/40937* (2013.01); *G05B 2219/34015* (2013.01);
(Continued)

(58) Field of Classification Search
CPC .............. G05B 19/19; G05B 19/40937; G05B 2219/34015; G05B 2219/34098;
(Continued)

(56) References Cited

U.S. PATENT DOCUMENTS

2004/0183494 A1*  9/2004  Nagaoka ................ G05B 19/19
                                                          318/632
2011/0166693 A1*  7/2011  Nishibashi ......... G05B 19/4103
                                                          700/187
(Continued)

FOREIGN PATENT DOCUMENTS

CN    102331744 A    1/2012
CN    102650867 A    8/2012
(Continued)

OTHER PUBLICATIONS

Decision to Grant Patent issued Nov. 10, 2015 in Japanese Patent Application No. 2014-159488 (3 pages) with an English Translation (3 pages).
The Notification of the First Office Action issued Jan. 17, 2017 in Chinese Patent Application No. 2015104755787 (5 pages) with an English translation (7 pages).

*Primary Examiner* — Robert Cassity
(74) *Attorney, Agent, or Firm* — Drinker Biddle & Reath LLP

(57) ABSTRACT

A numerical controller controls a machine tool with a plurality of control axes so as to compensate an inward turning error by inserting a curved movement path into a corner section between two consecutive blocks. An estimated inward turning amount generated as the corner section is subjected to post-interpolation acceleration/deceleration is calculated based on the radius of curvature of the curve and allowable accelerations of the axes of the machine tool, and such a curved movement path that its inward turning amount has a value obtained by subtracting the estimated inward turning amount from a tolerance is inserted into the corner section if the sum of the estimated inward turning and the inward turning amount of the curve is larger than the tolerance.

2 Claims, 5 Drawing Sheets

(52) U.S. Cl.
CPC ............... *G05B 2219/34098* (2013.01); *G05B 2219/35261* (2013.01); *G05B 2219/49164* (2013.01); *Y02P 90/265* (2015.11)

(58) Field of Classification Search
CPC   G05B 2219/35261; G05B 2219/49164; Y02P 90/265
USPC ........................................................ 700/187
See application file for complete search history.

(56) References Cited

U.S. PATENT DOCUMENTS

| | | |
|---|---|---|
| 2012/0010745 A1 | 1/2012 | Ide et al. |
| 2012/0221141 A1 | 8/2012 | Otsuki et al. |
| 2013/0268110 A1 | 10/2013 | Hamada |
| 2014/0025194 A1 | 1/2014 | Koide |
| 2014/0236340 A1 | 8/2014 | Terada et al. |

FOREIGN PATENT DOCUMENTS

| | | |
|---|---|---|
| JP | H10-329068 A | 12/1998 |
| JP | 2004-005049 A | 1/2004 |
| JP | 2008-225825 A | 9/2008 |
| JP | 5132842 B1 | 1/2013 |
| JP | 2013-069123 A | 4/2013 |
| JP | 2014-021759 A | 2/2014 |
| WO | WO-2013038529 A1 | 3/2013 |

\* cited by examiner

NUMERICAL CONTROLLER HAVING CORNER PATH GENERATION FUNCTION IN CONSIDERATION OF POST-INTERPOLATION ACCELERATION/DECELERATION

RELATED APPLICATION DATA

This application claims priority under 35 U.S.C. §119 and/or §365 to Japanese Application No. 2014-159488 filed Aug. 5, 2014, the entire contents is incorporated herein by reference.

BACKGROUND OF THE INVENTION

Field of the Invention

The present invention relates to a numerical controller, and more particularly, to a numerical controller capable of ensuring the machining accuracy of a workpiece (object to be machined) while suppressing shock on a machine, by calculating a curve in consideration of an inward turning amount due to post-interpolation acceleration/deceleration and inserting the curve into a command path of a machining program.

Description of the Related Art

In continuously executing blocks for a machining command in numerical control, a corner is formed in a machining path as the movement direction changes. Since the speed of each moving axis suddenly changes at a corner section, a machine is liable to be shocked.

In conventional numerical control, acceleration/deceleration processing for each axis is performed near the corner to suppress such shock. The acceleration/deceleration processing includes pre-interpolation acceleration/deceleration and post-interpolation acceleration/deceleration. In the pre-interpolation acceleration/deceleration, acceleration/deceleration is performed along the machining path before interpolation processing. In the post-interpolation acceleration/deceleration, acceleration/deceleration is performed for each axis after the interpolation processing.

In the pre-interpolation acceleration/deceleration, a corner speed is calculated such that a speed variation of each axis is not larger than a predetermined allowable speed difference, in order to suppress a sudden speed change of each axis at the corner section. Then, speed control is performed in such a manner that the feed speed is reduced at a point short of the corner section so that the speed at the corner section reaches the calculated corner speed and that the feed speed is increased after the corner section is reached.

In the post-interpolation acceleration/deceleration, the speeds of the axes determined by the post-interpolation acceleration/deceleration are locally averaged on time basis, that is, control is made to suppress a speed change of each axis, in order to further suppress shock on the machine. Consequently, acceleration/deceleration is performed overlapping between the blocks, so that the machining path is deviated from a specified path, thereby causing an inward turning error.

Instead of suppressing the shock on the machine by the acceleration/deceleration processing, the corner itself may be removed by changing the command. In this method, the corner is removed by inserting a curve that smoothly connects blocks ahead of and behind the corner within the range of an allowable inward turning amount into the corner section in the machining command. This method is the same as the method of post-interpolation acceleration/deceleration in that the inward turning occurs. Since the post-interpolation acceleration/deceleration is averaged on time basis, however, the inward turning amount changes depending on the corner shape and the feed speed. Since the curve inserted into the corner section does not depend on the corner shape or the feed speed, in contrast, the machining accuracy can be easily controlled.

Japanese Patent Application Laid-Open No. 2008-225825 has proposed a prior art method for controlling the inward turning amount at the corner section. According to this method, a corner is removed by inserting a plurality of smooth curves between blocks on its opposite sides. Further, a technique disclosed in Japanese Patent Application Laid-Open No. 2013-069123 has solved the problem of the inward turning amount exceeding its tolerance on account of post-interpolation acceleration/deceleration by reducing a target feed speed at the corner section to an appropriate speed.

Furthermore, Japanese Patent Application Laid-Open No. 2014-021759 has proposed a method in which an inward turning amount at a corner is controlled to be within a predetermined tolerance without regard to the machining shape or the command speed by inserting a plurality of curves between blocks ahead of and behind the corner, and shock on a machine is eased by continuously varying the direction and curvature at the corner.

When post-interpolation acceleration/deceleration is performed, the inward turning amount changes depending on the direction changing angle at the corner section, the difference between axes moving on the opposite sides of the corner, or a time constant indicative of post-interpolation acceleration/deceleration properties. In order to restrict the inward turning amount to a certain value, therefore, the allowable speed difference between the axes and the time constant of the post-interpolation acceleration/deceleration must be adjusted for each machine and machining program used.

Although the inward turning amount at the corner section can be controlled when the curves are inserted into the corner section, on the other hand, interpolation points become discrete data as the curves are interpolated. Since command pulses for a servomotor are generated from the interpolation points, they cannot take strictly continuous values. Thus, it is difficult to fully suppress shock on the machine caused by the insertion of the curves, so that post-interpolation acceleration/deceleration is generally performed in conjunction with the insertion.

Since the servomotor is also subject to some delay from the command pulses from a numerical controller, moreover, influences of the post-interpolation acceleration/deceleration and the servomotor delay cannot be completely ignored even when the curves are inserted into the corner section.

However, the techniques described in Japanese Patent Applications Laid-Open Nos. 2008-225825 and 2014-021759 have a problem that the curves are inserted into the corner section not taking into consideration the inward turning amount due to the post-interpolation acceleration/deceleration or the servomotor delay. Further, the technique described in Japanese Patent Application Laid-Open No. 2013-069123 has a problem that the time constant of the post-interpolation acceleration/deceleration has to be increased to suppress the shock at the corner section, so that the feed speed has to be fully reduced to limit the inward turning amount at the corner section.

SUMMARY OF THE INVENTION

Accordingly, the object of the present invention is to provide a numerical controller capable of suppressing shock on a machine on the opposite sides of a corner while ensuring the machining accuracy of a workpiece.

A numerical controller according to the present invention controls a machine tool comprising a plurality of control axes so as to compensate an inward turning error by inserting a curved movement path into a corner section between two consecutive blocks in a machining program comprising a plurality of blocks. The numerical controller comprises an allowable inward turning amount setting unit, configured to set an allowable inward turning amount generated at the corner section between the blocks, and a corner path generation unit configured to insert the curved movement path with an inward turning amount not larger than the allowable inward turning amount into the corner section between the blocks. The corner path generation unit is configured to calculate an estimated inward turning amount generated as the corner section is subjected to post-interpolation acceleration/deceleration, based on the radius of curvature of the curve and allowable accelerations of the axes of the machine tool, and insert such a curved movement path that the inward turning amount has a value obtained by subtracting the estimated inward turning amount from the allowable inward turning amount into the corner section between the blocks in case where the sum of the inward turning amount of the curve and the estimated inward turning amount is larger than the allowable inward turning amount.

The corner path generation unit may be configured to calculate the estimated inward turning amount as follows:

$$S=\{(1/24)T_1^2+(1/2)T_2^2\}\cdot(v^2/r),$$

where $T_1$ is a post-interpolation acceleration/deceleration time constant, $T_2$ is a servomotor time constant, v is a feed speed, and r is a circular arc radius.

According to the present invention, an inward turning amount due to post-interpolation acceleration/deceleration or an inward turning amount due to a servomotor delay is estimated in the control for inserting the curve that smoothly connects the blocks ahead of and behind the corner, and the inward turning amount of the curve to be inserted into the corner section is limited. Thus, a problem is solved by controlling the path subjected to post-interpolation acceleration/deceleration so that the inward turning amount of the path finally falls within a tolerance range. In inserting the curve, moreover, the machining accuracy of the path subjected to post-interpolation acceleration/deceleration can be controlled by previously subtracting the inward turning amount due to post-interpolation acceleration/deceleration from the allowable inward turning amount.

According to the present invention configured as described above, machining can be achieved with a specified accuracy without regard to the corner shape or the feed speed when the curve is inserted into the corner section so that the blocks ahead of and behind the corner are smoothly connected based on the combination with post-interpolation acceleration/deceleration. Thus, the machining accuracy of a workpiece can be ensured while suppressing shock on a machine by post-interpolation acceleration/deceleration.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
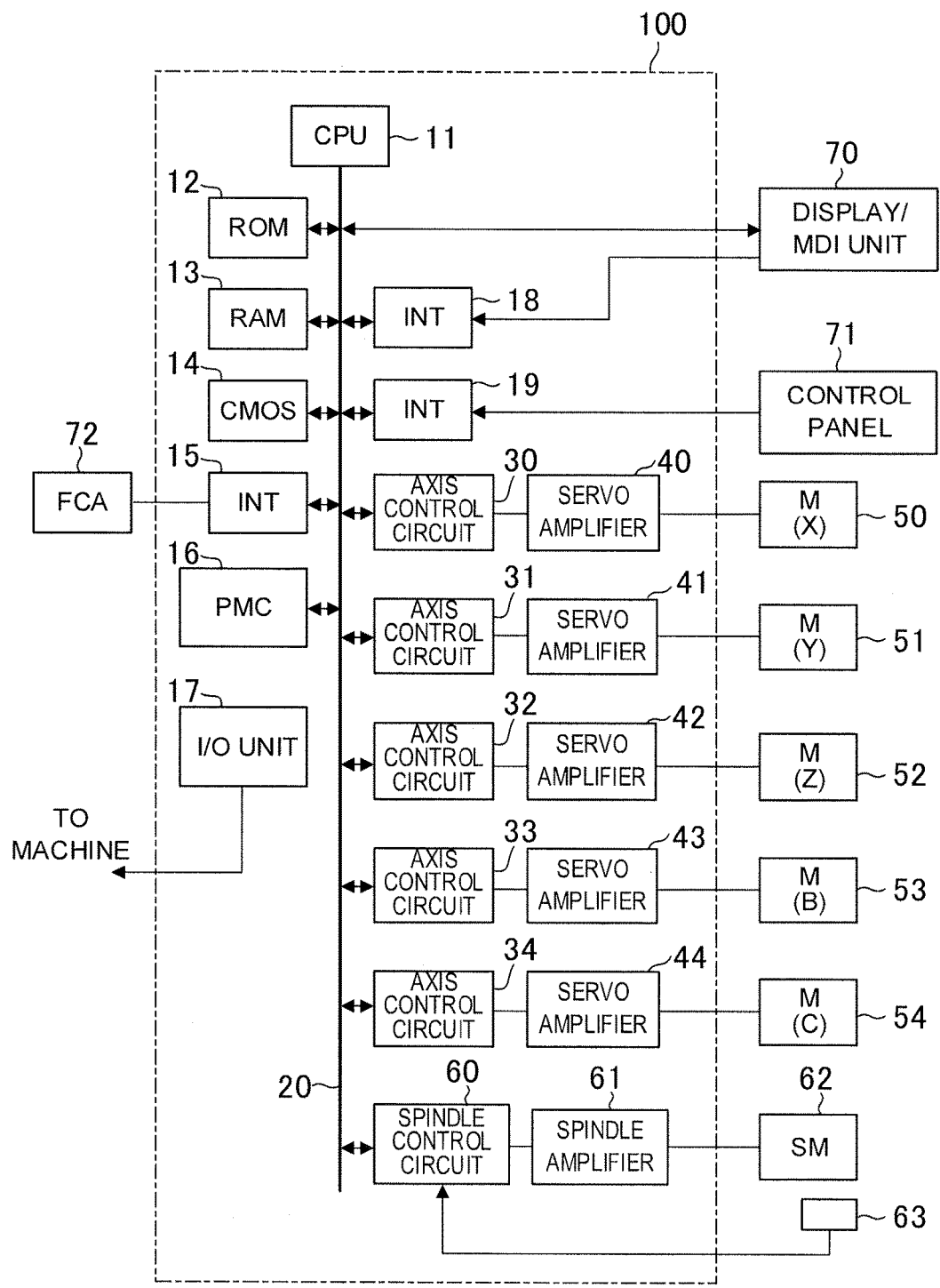
FIG. 1 is a schematic block diagram of one embodiment of a numerical controller according to the present invention.

FIG. 1 is a schematic block diagram of one embodiment of a numerical controller according to the present invention.

A CPU 11 is a processor for generally controlling a numerical controller 100 and it reads a system program stored in a ROM 12 through a bus 20 and generally controls the numerical controller 100 according to the read system program. A RAM 13 is loaded with temporary calculation data, display data, and various data input by an operator through a display/MDI unit 70.

A CMOS memory 14 is constructed as a nonvolatile memory, which is backed up by a battery (not shown) so that it can maintain its storage state even after the numerical controller 100 is powered off. The CMOS memory 14 is stored with a machining program read through an interface 15, a machining program input through the display/MDI unit 70, and the like. Further, the ROM 12 is preloaded with various system programs for the execution of edit-mode processing required for the creation and editing of the machining programs and processing for automatic operation.

Various machining programs, such as those for carrying out the present invention, can be input through the interface 15 or the display/MDI unit 70 and stored in the CMOS memory 14.

The interface 15 enables connection between the numerical controller 100 and an external device 72, such as an adapter. The machining programs, various parameters, and the like are read from the external device 72. Further, the machining programs edited in the numerical controller 100 can be stored into external storage means through the external device 72. A programmable machine controller (PMC) 16 outputs signals to auxiliary devices (e.g., an actuator such as a robot hand for tool change) of a machine tool through an I/O unit 17, thereby controlling them, according to sequential programs in the numerical controller 100. On receiving signals from various switches of a control panel on the body of the machine tool (not shown), moreover, the PMC 16 performs necessary signal processing and then delivers the signals to the CPU 11.

The display/MDI unit 70 is a manual data input device comprising a display, a keyboard, and the like. An interface 18 receives commands and data from the keyboard of the display/MDI unit 70 and delivers them to the CPU 11. An interface 19 is connected to a control panel 71 provided with a manual pulse generator and the like.

Axis control circuits 30 to 34 for individual axes receive axis movement commands from the CPU 11 and output the commands for the individual axes to servo amplifiers 40 to 44. On receiving these commands, the servo amplifiers 40 to 44 drive servomotors 50 to 54 for the individual axes, respectively. The servomotors 50 to 54 incorporate position/speed detectors, individually. Position/speed feedback signals from these position/speed detectors are fed back to the axis control circuits 30 to 34 to carry out position/speed feedback control. A position/speed feedback is not shown in the block diagram of FIG. 1.

A spindle control circuit 60 receives a spindle rotation command for the machine tool and outputs a spindle speed signal to a spindle amplifier 61. On receiving this spindle speed signal, the spindle amplifier 61 rotates a spindle motor 62 of the machine tool at a commanded rotational speed, thereby driving a tool.

A position coder 63 is connected to the spindle motor 62 by gears, a belt, or the like. The position coder 63 outputs feedback pulses in synchronism with the rotation of a spindle, and the feedback pulses are read through the bus 20 by the CPU 11.

Figure 2:
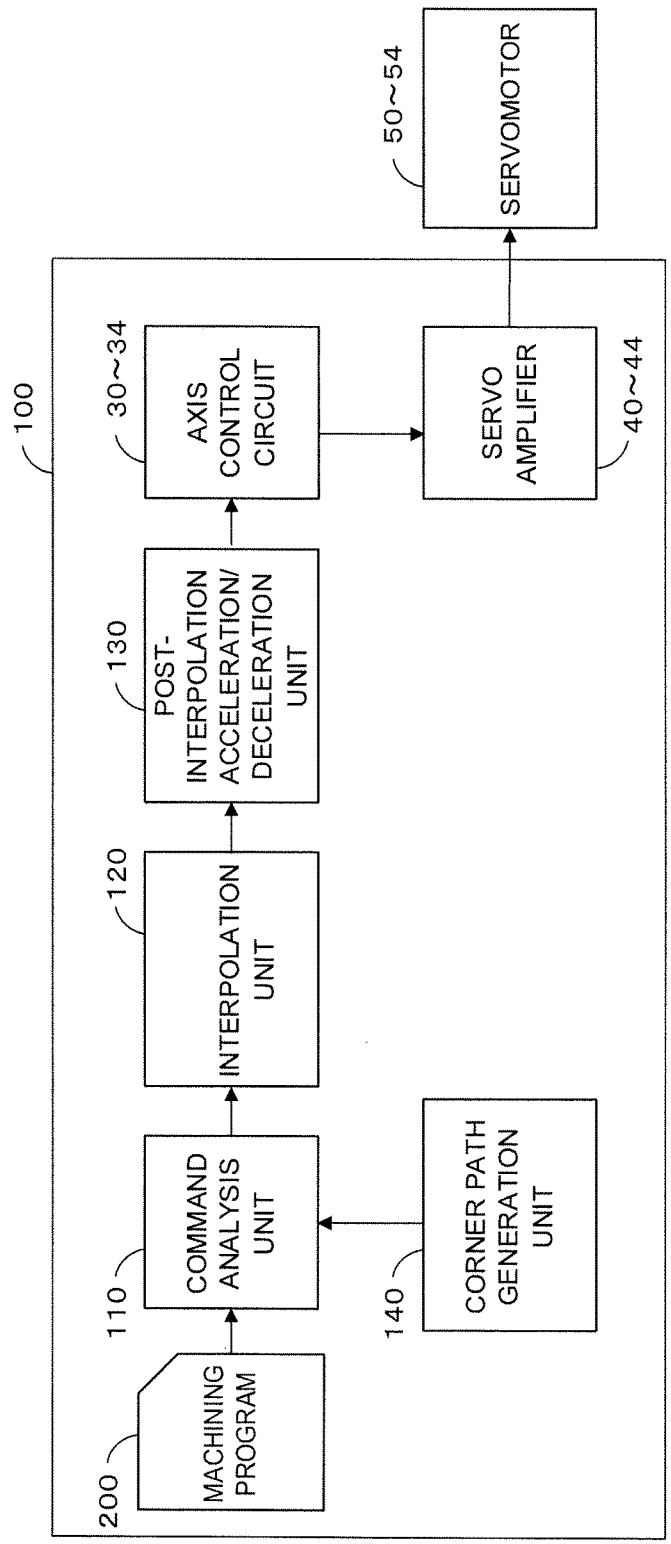
FIG. 2 is a functional block diagram of the numerical controller of FIG. 1.

FIG. 2 is a functional block diagram of the numerical controller 100 of FIG. 1.

The numerical controller 100 comprises a command analysis unit 110, interpolation unit 120, post-interpolation acceleration/deceleration unit 130, and corner path generation unit 140. The command analysis unit 110 analyzes a machining program 200 read from a CMOS memory 14 or the like and converts it into an executable format. The interpolation unit 120 performs interpolation processing based on an executable command output from the command analysis unit 110 and outputs movement commands for the axes. The post-interpolation acceleration/deceleration unit 130 carries out post-interpolation acceleration/deceleration processing for the axis movement commands output from the interpolation unit 120 and carries out drive control for the axes based on the processed axis movement commands.

The corner path generation unit 140, which constitutes a characteristic of the present invention, functions during the analysis processing by the command analysis unit 110. The corner path generation unit 140 calculates a curve in consideration of a inward turning amount due to post-interpolation acceleration/deceleration by corner path generation processing (described later) and inserts the calculated curve into a command path of the machining program.

The following is a description of examples in which the corner path generation processing performed by the corner path generation unit 140 is applied to machine tools for three-axis machining and five-axis machining, individually.

(I) Example of Corner Path Generation Processing Applied to Machine Tool for Three-Axis Machining In the corner path generation processing of this example, a curve is inserted into a corner section in consideration of the inward turning amount of the movement path generated by post-interpolation acceleration/deceleration processing of a free-form curve. In the corner path generation processing, a curvature radius r at an arbitrary point on the curve is calculated in consideration of the difficulty in the estimation of the inward turning amount due to post-interpolation acceleration/deceleration of the free-form curve in the process of command analysis, and the inward turning amount is estimated on the assumption that the point is on an arc of an imaginary circle with the radius r. The following is a description of a specific procedure.

Figure 3:
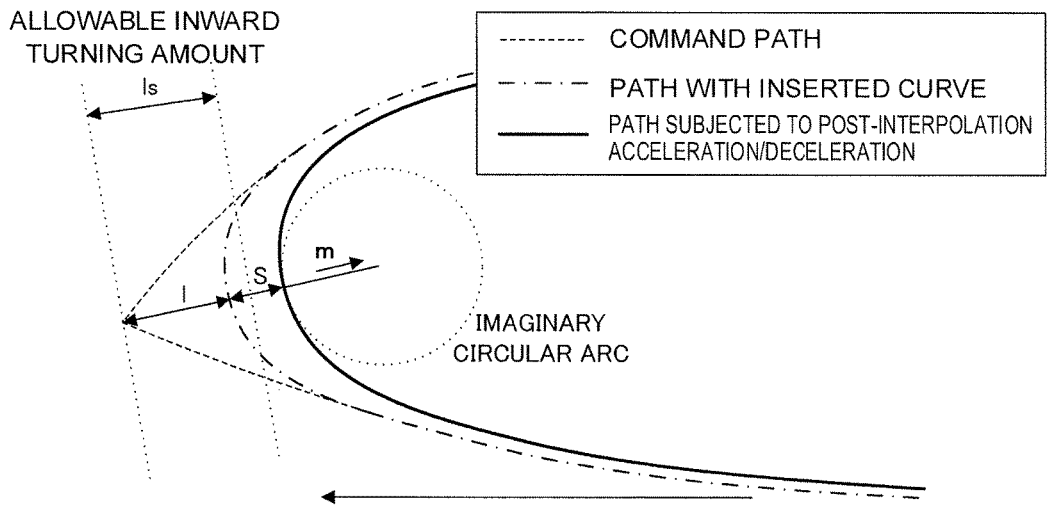
FIG. 3 is a diagram illustrating a control axis path in the process of curve insertion in corner path generation processing performed by the numerical controller of the present invention.

FIG. 3 is a diagram illustrating an axis movement path for the case where the curve is inserted within the range of an allowable inward turning amount for the corner section. Since a method for inserting the curve within the range of the allowable inward turning amount for the corner section is a conventional technique, it will not be described in detail herein.

If the allowable inward turning amount for the corner section is $l_s$, as shown in FIG. 3, a curve that smoothly connects blocks ahead of and behind the corner within the range of the allowable inward turning amount $l_s$ can be obtained by using the conventional technique. When this is done, the maximum amount of inward turning of the curve to be obtained is assumed to be l.

If maximum allowable accelerations for X-, Y-, and Z-axes that constitute the machine are $a_x$, $a_y$, and $a_z$, respectively, and if axis components of a unit vector m directed to the center of the imaginary circular arc are $\cos\theta_x$, $\cos\theta_y$, and $\cos\theta_z$, then a maximum feed speed v that does not exceed the maximum allowable acceleration for each axis is given by expression (1) as follows:

$$v=\min\{F,\sqrt{(a_{min}\cdot r)}\}$$
$$(a_{min}=\min\{(a_x/\cos\theta_x),(a_y/\cos\theta_y),(a_z/\cos\theta_z)\}), \quad (1)$$

where F and r are a command speed and the circular arc radius, respectively.

If the feed speed, circular arc radius, time constant of post-interpolation acceleration/deceleration, and time constant of the servomotors are v, r, $T_1$ and $T_2$, respectively, an inward turning amount S for circular arc interpolation can be approximated by expression (2) as follows:

$$S=\{(1/24)T_1^2+(1/2)T_2^2\}\cdot(v^2/r). \quad (2)$$

Accordingly, an actual inward turning amount $S_a$ in consideration of even post-interpolation acceleration/deceleration is given by expression (3) as follows:

$$S_a=l+S. \quad (3)$$

Figure 4:
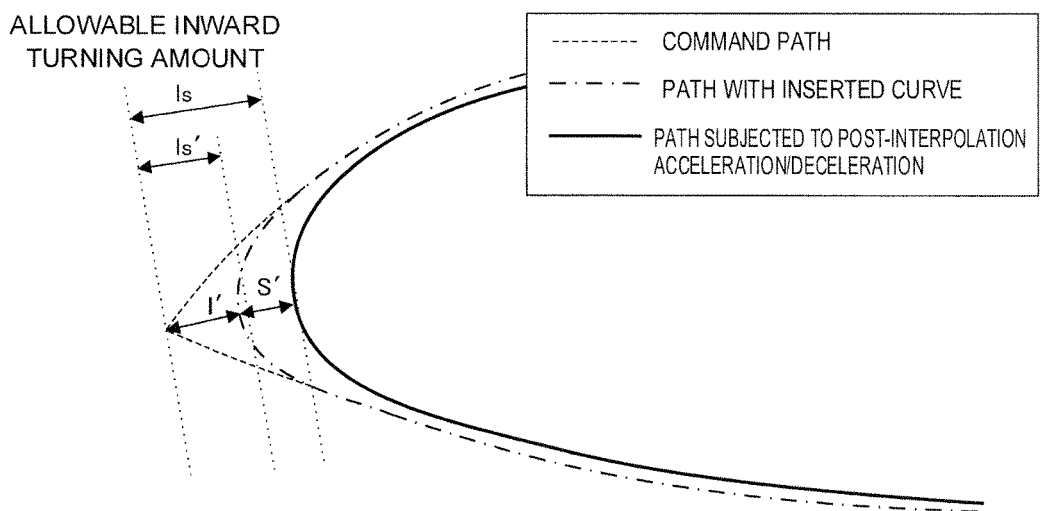
FIG. 4 is a diagram illustrating a control axis path after the curve insertion in the corner path generation processing performed by the numerical controller of the present invention.

The value $S_a$ thus obtained causes no problem if it is $S_a=l+S\leq l_s$. If $S_a$ is $S_a=l+S>l_s$, however, the inward turning amount at the corner section inevitably exceeds its tolerance as a result of post-interpolation acceleration/deceleration. In this case, as shown in FIG. 4, a curve is inserted anew into the corner section with an allowable inward turning amount $l_s'$ of the curve at the corner section set to $l_s'=l_s-S$.

The above is a description of an outline of processing for inserting the curve into the corner section in the corner path generation processing. The following is a description of how a sum $S_a'$ ($=l'+S'$) of an inward turning amount $l'$ of the curve thus obtained and an inward turning amount $S'$ due to post-interpolation acceleration/deceleration becomes not larger than the allowable inward turning amount $l_s$ at the corner section. The relationship between $l'$ and $l_s$ ($l'\leq l_s'$) can be represented by expression (4) as follows:

$$l'\leq l_s'=l_s-S. \quad (4)$$

In general, an inward turning amount due to post-interpolation acceleration/deceleration causes a problem when the curvature radius of an imaginary circle is small or the command speed is high. If the inward turning amount due to post-interpolation acceleration/deceleration is problematic under these conditions, the feed speed at the corner section, based on expression (1), is given by expression (5) as follows:

$$v=\sqrt{(a_{min}\cdot r)} \quad (5)$$

By applying expression (5) to expression (2), expression (6) can be derived as follows:

$$S=\{(1/24)T_1^2+(1/2)T_2^2\}\cdot a_{min}. \quad (6)$$

It can be seen, therefore, that the inward turning amount due to post-interpolation acceleration/deceleration is determined by the allowable acceleration without depending on the curvature radius of the curve or the feed speed. Thus, if unit vectors cos θ$_x$, cos θ$_y$, and cos θ$_z$ directed to the centers of the imaginary circular arcs of the curves inserted as l$_s$ and l$_s$' into the corner section are substantially invariable, S' is equal to S, so that expression (7) can be derived as follows by applying S'=S to expression (4):

$$S_a'=l'+S'<l_s-S+S=l_s. \quad (7)$$

Accordingly, the inward turning amount S$_a$' in consideration of even post-interpolation acceleration/deceleration of the obtained curve is not larger than the allowable inward turning amount.

Figure 5:
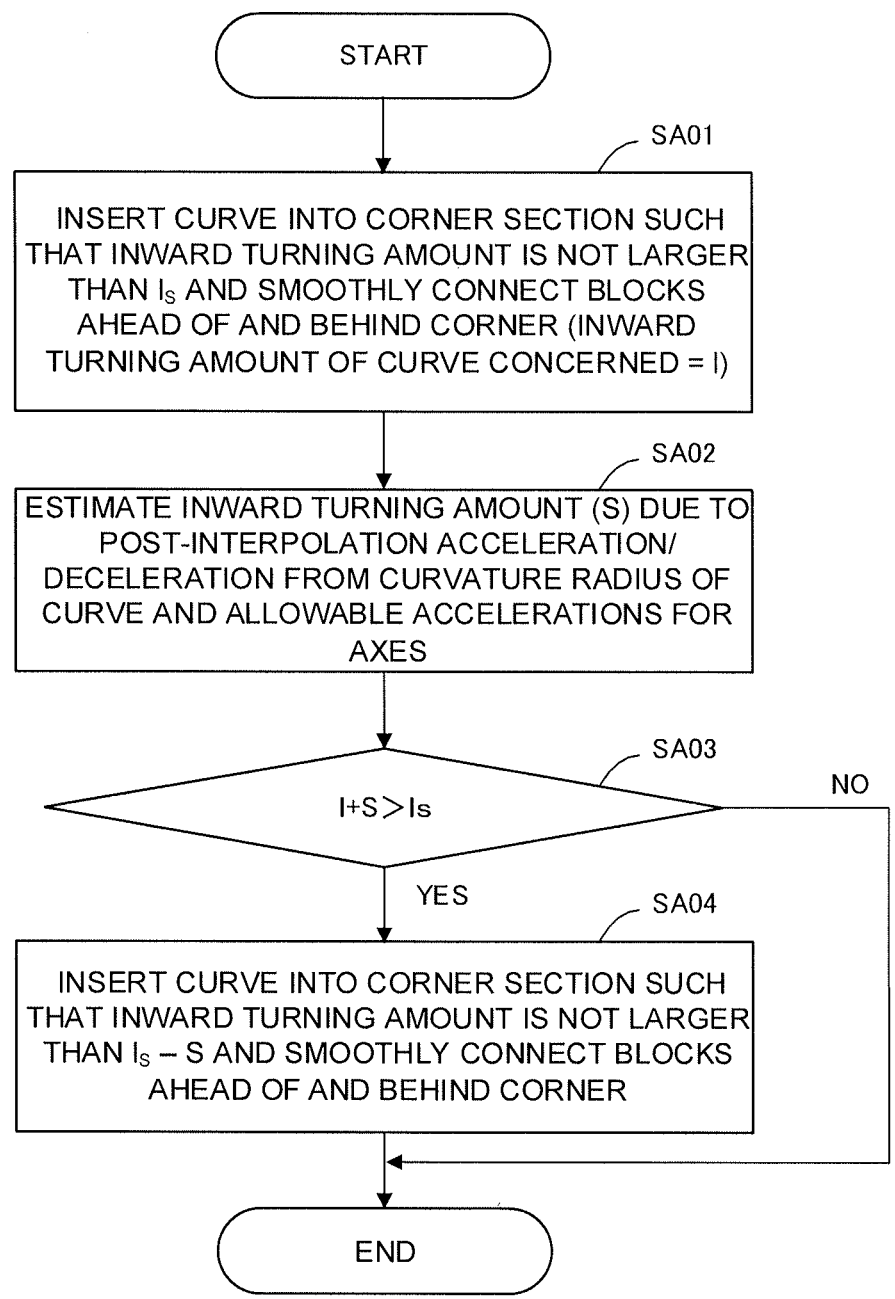
FIG. 5 is a flowchart showing a flow of processing in the case where the corner path generation processing by a corner path generation unit of FIG. 2 is performed on the numerical controller of the present invention.

FIG. 5 is a flowchart showing a flow of processing in the case where the corner path generation processing by the corner path generation unit 140 described above is performed on the numerical controller. This processing is invoked and performed if the corner section is defined by a machining path as the movement direction changes when the movement commands are analyzed by the command analysis unit 110.

[Step SA01] A curve is inserted into the corner section such that the inward turning amount is not larger than the allowable inward turning amount l$_s$ at the corner section, and the blocks ahead of and behind the corner are smoothly connected. The inward turning amount of the curve in this state is assumed to be l.

[Step SA02] The inward turning amount S due to post-interpolation acceleration/deceleration is estimated based on the curvature radius of the curve inserted in Step SA01 and the allowable accelerations for the axes. The allowable accelerations for the axes may be either retrieved from parameter values for the axes set in the numerical controller 100 or designated by commands in the machining program.

[Step SA03] It is determined whether or not the sum of the inward turning amount 1 of the curve obtained in Step SA01 and the inward turning amount S due to post-interpolation acceleration/deceleration estimated in Step SA02 is larger than the allowable inward turning amount l$_s$ at the corner section. If the sum is larger than the allowable inward turning amount l$_s$ at the corner section, the processing proceeds to Step SA04. If not, this processing ends.

[Step SA04] A curve is inserted into the corner section such that the inward turning amount is not larger than (l$_s$−S), and the blocks ahead of and behind the corner are smoothly connected.

As described above, the axis movement path for the case where the curve is inserted by the corner path generation processing applied to the machine tool for three-axis machining finally becomes such a movement path that its inward turning amount affected by post-interpolation acceleration/deceleration falls within a tolerance range. Thus, the machining accuracy of a workpiece can be ensured while suppressing shock on the machine by post-interpolation acceleration/deceleration.

(II) Example of Corner Path Generation Processing Applied to Machine Tool for Five-Axis Machining This example of the corner path generation processing is applied to a machine tool for five-axis machining that comprises three linear axes (X-, Y-, and Z-axes) and two rotation axes (B- and C-axes).

Figure 6:
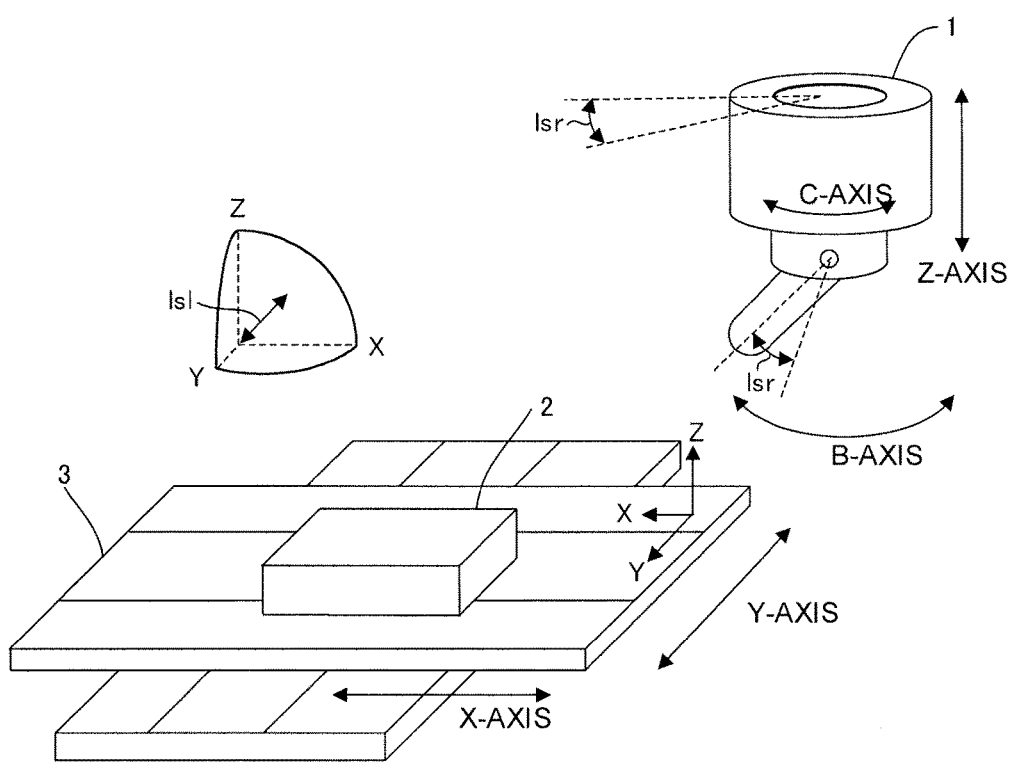
FIG. 6 is a schematic view of a machine tool for five-axis machining comprising three linear axes (X-, Y-, and Z-axes) and two rotation axes (B- and C-axes) controlled by the numerical controller of the present invention.

FIG. 6 is a schematic view of the machine tool for five-axis machining comprising the three linear axes (X-, Y-, and Z-axes) and the two rotation axes (B- and C-axes). In this machine tool, as shown in FIG. 6, a table 3 on which a workpiece 2 is placed moves on an XY-axis plane, while a tool head 1 with a tool moves along the Z-axis. The B- and C-axes are rotation axes.

When the machine tool of this type is controlled by means of the numerical controller 100, let us assume that a curve is inserted within the range of an allowable inward turning amount for a corner section of each linear axis so that blocks ahead of and behind the corner can be smoothly connected. In this case, the allowable inward turning amount at the corner section of each linear axis and the allowable inward turning amount of each rotation axis are represented by l$_{sl}$ and l$_{sr}$, respectively. Also, the maximum inward turning amount of the linear axis of the inserted curve and that of the rotation axis are represented by l$_l$ and l$_r$, respectively.

If maximum allowable accelerations for X-, Y-, Z-, B-, and C-axes that constitute the machine are a$_x$, a$_y$, a$_z$, a$_b$, and a$_c$, respectively, and if axis components of a unit vector directed to the center of an imaginary circular arc are cos θ$_x$, cos θ$_y$, cos θ$_z$, cos θ$_b$, and cos θ$_c$, a maximum feed speed v that does not exceed the maximum allowable acceleration for each axis is given by expression (8) as follows:

$$v=\min\{F,\sqrt{(a_{min}\cdot r)}\}$$

$$(a_{min}=\min\{(a_x/\cos\theta_x),(a_y/\cos\theta_y),(a_z/\cos\theta_z),(a_y/\cos\theta_b),(a_z/\cos\theta_c)\}) \quad (8)$$

where F is a command speed and r is the radius of the imaginary circular arc in contact with an arbitrary point on the curve, as in the case of the "(I) Example of Corner Path Generation Processing Applied to Machine Tool for Three-Axis Machining".

If the feed speed, circular arc radius, time constant of post-interpolation acceleration/deceleration, and time constant of servomotors are v, r, T$_1$, and T$_2$, respectively, an inward turning amount S for circular arc interpolation can be approximated by expression (9) as follows:

$$S=\{(1/24)T_1^2+(1/2)T_2^2\}\cdot(v^2/r). \quad (9)$$

Further, a linear axis component S$_l$ and a rotation axis component S$_r$ of the inward turning amount for circular arc interpolation due to post-interpolation acceleration/deceleration are defined by expression (10) as follows:

$$S_l=\sqrt{(\cos^2\theta_x+\cos^2\theta_y+\cos^2\theta_z)}\cdot S,$$

$$S_r=\max\{|\cos\theta_b|,|\cos\theta_c|\}\cdot S. \quad (10)$$

Accordingly, an actual inward turning amount in consideration of even post-interpolation acceleration/deceleration consists of a linear axis component S$_{al}$ (=l$_l$+S$_l$) and a rotation axis component S$_{ar}$ (=l$_r$+S$_r$).

There is no problem if l$_l$+S$_l$≤l$_{sl}$ and l$_r$+S$_r$≤l$_{sr}$ are given. If l$_l$+S$_l$>l$_{sl}$ or l$_r$+S$_r$>l$_{sr}$ is given, however, the inward turning amount at the corner section inevitably exceeds its tolerance as a result of post-interpolation acceleration/deceleration. In this case, a curve is inserted anew into the corner section with the allowable inward turning amount at the corner section of each linear axis set to l$_{sl}$'=l$_{sl}$−S$_l$ if l$_l$+S$_l$>l$_{sl}$ is given or with the allowable inward turning amount at the corner section of each rotation axis set to l$_{sr}$'=l$_{sr}$−S$_r$ if l$_r$+S$_r$>l$_{sr}$ is given.

If l$_{sl}$'=l$_{sl}$−S$_l$<0 or l$_{sr}$'=l$_{sr}$−S$_r$<0 is given, on the other hand, the inward turning amount due to post-interpolation acceleration/deceleration inevitably exceeds the allowable inward turning amount even though the inward turning amount of the curve is zero. Therefore, the inward turning amount due to post-interpolation acceleration/deceleration is restricted to the allowable inward turning amount by appropriately reducing the feed speed at the corner section.

In this way, the corner path generation processing based on the insertion of the curve performed by the numerical controller according to the present invention can be applied to the machine tool for five-axis machining.

The invention claimed is:

1. A numerical controller which controls a machine tool comprising a plurality of control axes so as to compensate an inward turning error by inserting a curved movement path into a corner section between two consecutive blocks in a machining program comprising a plurality of blocks, the numerical controller comprising:

non-transitory computer readable memory;

one or more hardware processors coupled to the non-transitory memory and configured to read instructions from the non-transitory memory to cause the numerical controller to perform operations comprising:

determining that an actual inward turning amount, $S_a$, is greater than the allowable inward turning amount, $l_s$, at the corner section, wherein $S_a$ is the sum of the maximum allowable inward turning of a curve, l, and an inward turning amount, S, for circular arc interpolation, wherein $S_a$ being greater than ls indicates that the machine tool exceeds its tolerance;

inserting the curved movement path into the corner section with a new allowable inward turning amount, $l_s'$, wherein $l_s'$ is computed as the difference between $l_s$ and S, and $l_s'$ is greater than or equal to an inward turning amount of the curve, l', wherein a new actual inward turning amount, $S_a'$, is equal to the sum of l' and an inward turning amount due to post-interpolation acceleration/deceleration, S', and $S_a'$ is less than the $l_s$ at the corner section; and controlling the machine tool according to the inserted curved movement path.

2. The numerical controller according to claim 1, wherein S is calculated as follows:

$$S=\{(1/24)T_1^2+(1/2)T_2^2\}(v^2/r),$$

where $T_1$ is a post-interpolation acceleration/deceleration time constant, $T_2$ is a servomotor time constant, v is a feed speed, and r is a circular arc radius.

* * * * *